US010956607B2

(12) United States Patent
Rajashekaraiah et al.

(10) Patent No.: US 10,956,607 B2
(45) Date of Patent: Mar. 23, 2021

(54) CONTROLLING NON-OWNER ACCESS TO MEDIA CONTENT ON A COMPUTING DEVICE (71) Applicant: Motorola Mobility LLC, Chicago, IL (US)

(72) Inventors: Renuka Prasad Herur Rajashekaraiah, Bangalore (IN); Amit Kumar Agrawal, Bangalore (IN); Rakshit Khosla, Hawthorn Woods, IL (US)

(73) Assignee: Motorola Mobility LLC, Chicago, IL (US)

(*) Notice: Subject to any disclaimer, the term of this patent is extended or adjusted under 35 U.S.C. 154(b) by 262 days.

(21) Appl. No.: 15/996,054

(22) Filed: Jun. 1, 2018

(65) Prior Publication Data
US 2019/0370488 A1 Dec. 5, 2019

(51) Int. Cl.
G06F 7/04 (2006.01)
H04N 7/16 (2011.01)
G06F 21/62 (2013.01)
G06F 21/31 (2013.01)
G06F 21/32 (2013.01)

(52) U.S. Cl.
CPC ........ G06F 21/6245 (2013.01); G06F 21/316 (2013.01); G06F 21/32 (2013.01)

(58) Field of Classification Search
None
See application file for complete search history.

(56) References Cited

U.S. PATENT DOCUMENTS

| | | | | |
|---|---|---|---|---|
| 9,286,482 B1 * | 3/2016 | Dumont | ................. | G06F 21/32 |
| 9,319,221 B1 * | 4/2016 | Awad | .................... | H04L 9/3231 |
| 2005/0120082 A1 * | 6/2005 | Hesselink | ........... | H04L 63/0272 |
| | | | | 709/203 |
| 2006/0136498 A1 * | 6/2006 | Insley | .................... | G06Q 10/00 |
| 2008/0154903 A1 * | 6/2008 | Crowley | ............... | G06F 16/182 |
| 2011/0216209 A1 * | 9/2011 | Fredlund | ............... | G01S 3/7864 |
| | | | | 348/211.99 |
| 2015/0128291 A1 * | 5/2015 | Hyodo | ................ | G06F 21/6218 |
| | | | | 726/28 |
| 2015/0237268 A1 * | 8/2015 | Vaiaoga | ................. | H04N 5/265 |
| | | | | 348/218.1 |
| 2016/0156624 A1 * | 6/2016 | Yang | ....................... | H04L 63/10 |
| | | | | 726/4 |
| 2016/0210467 A1 * | 7/2016 | Mehrab | ............... | G06F 21/6245 |
| 2018/0046844 A1 * | 2/2018 | Huang | .............. | G06K 9/00013 |

* cited by examiner

Primary Examiner — Phy Anh T Vu
(74) Attorney, Agent, or Firm — FIG. 1 Patents (57) ABSTRACT A content access control system of a device determines whether the device is in possession of an owner of the device or another (secondary or non-owner) user and controls access to media content stored on the device based on the determination. The person in possession of the device at any given time is typically the person holding the device in his or her hand(s). If the device is in possession of the device owner, the system allows all media content on the device to be accessed. If the device is in possession of a secondary user, the system restricts access to media content on the device, such as by displaying only media content that has been captured within a threshold amount of time (e.g., the past hour) and that includes both the owner and the secondary user. Other restrictions can also be applied, such as disabling presentation of notifications.

20 Claims, 6 Drawing Sheets

CONTROLLING NON-OWNER ACCESS TO MEDIA CONTENT ON A COMPUTING DEVICE

BACKGROUND

As technology has advanced, people have become increasingly reliant upon a variety of different computing devices, such as wireless devices (e.g., wireless phones or tablets). While these computing devices offer a variety of different benefits, they are not without their problems. One such problem is that given the processing and storage capabilities of current wireless devices, users tend to store a lot of content on their devices, such as large numbers of photos. When a photo is captured in a group setting, members of the group other than the device owner oftentimes like to grab the device in order to view the recently taken photo. However, this allows the other members of the group to view other images and content on the device, whether accidentally or intentionally. This ability for others to view images that the device owner may consider personal and private can lead to user dissatisfaction and frustration with their computing devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, in a computing device a request to view media content previously captured by the computing device is received from a current user that is in possession of the computing device. Whether the current user is an owner of the computing device or a secondary user of the computing device is determined. In response to determining that the current user is the secondary user of the computing device, only media content that includes both the secondary user and the owner is displayed. In response to determining that the current user is the owner of the device, display of all of the media content is allowed.

In accordance with one or more aspects, a computing device includes a processor and a computer-readable storage medium having stored thereon multiple instructions that. The multiple instructions, responsive to execution by the processor, cause the processor to perform acts including receiving, from a current user that is in possession of the computing device, a request to view media content stored on the computing device, and determining whether the current user is an owner of the computing device or a secondary user of the computing device. The acts further include displaying, in response to determining that the current user is the secondary user of the computing device, only media content that includes both the secondary user and the owner, and allowing, in response to determining that the current user is the owner of the device, display of all of the media content.

A computing device includes an image capture module, a storage device, and a content access control system, implemented at least in part in hardware. The content access control system includes a current user detection module and an access control module. The current user detection module is configured to determine whether a current user that is in possession of the computing device is an owner of the computing device or a secondary user of the computing device. The access control module is configured to allow, in response to determining that the current user is the secondary user of the computing device, display of only media content stored in the storage device that includes both the secondary user and the owner, and to allow, in response to determining that the current user is the owner of the device, display of all of the media content stored in the storage device.

BRIEF DESCRIPTION OF THE DRAWINGS

Embodiments of controlling non-owner access to media content on a computing device are described with reference to the following drawings. The same numbers are used throughout the drawings to reference like features and components.

DETAILED DESCRIPTION

Controlling non-owner access to media content on a computing device is discussed herein. A content access control system determines whether the computing device is in possession of (e.g., being held by) an owner of the device or another (secondary) user. The secondary user is also referred to as a non-owner user. The owner of the computing device refers to a primary user of the computing device. The owner of the computing device typically is a user that has an account on the computing device and can log into the computing device (e.g., with a password, fingerprint identification, face identification, etc.). The owner of the computing device typically is, but need not be, the purchaser of the computing device (e.g., a company may pay for a computing device for an employee, and the employee is the primary user of the computing device and thus is referred to as the owner herein). The secondary user refers to another person that can use the computing device but need not, and typically does not, have an account on the computing device (and thus does not log into the device). The secondary user can be, for example, a friend or family member of the owner of the computing device.

The content access control system controls access to media content stored on the computing device based on whether the computing device is in possession of the owner of the computing device or a secondary user of the computing device. The person in possession of the computing device at any given time is typically the person holding the computing device in his or her hand(s). In situations where the computing device is in possession of the computing device owner, the content access control system allows all media content on the computing device to be accessed (subject to any additional systems that control access based on whether the user has logged into the computing device). In situations where the computing device is in possession of a secondary user, the content access control system restricts access to media content on the computing device. This restriction can be, for example, displaying only media content that has been captured within a threshold amount of time (e.g., the past hour) and that includes both the owner and the secondary user. Additionally or alternatively, other restrictions can be applied, such as disabling notification presentation (e.g., by preventing display of text messages or notifications by the computing device).

The techniques discussed herein improve security and usability of the computing device. The computing device owner is able to take pictures in a group setting and pass the device to other users in that group, thereby allowing those other users to view photos that the computing device owner has taken while knowing that those other users will not be able to view photos that they are not included in. Generally, this provides secondary users access to only those photos where both the owner and the secondary user are consciously aware of the fact that their photos are being taken and thus there is no privacy issue in terms of allowing access to that media content. Furthermore, the computing device owner knows that additional content, such as notifications of received messages, will not be displayed to the other users. The security of the computing device is thus improved, protecting content that does not include another user from being displayed to that other user while the computing device is in the possession of that other user.

Figure 1:
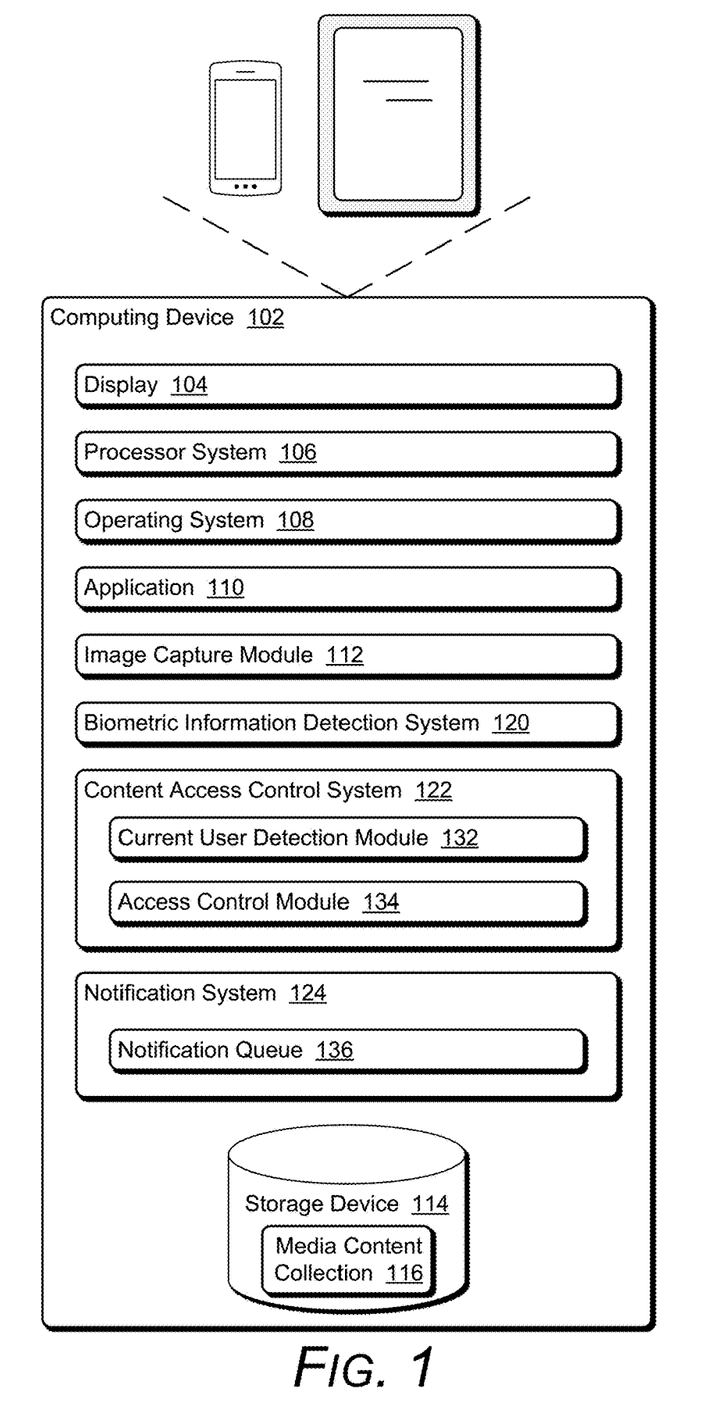
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The computing device 102 also includes a processor system 106 that includes one or more processors, each of which can include one or more cores. The processor system 106 is coupled with, and may implement functionalities of, any other components or modules of the computing device 102 that are described herein. In one or more embodiments, the processor system 106 includes a single processor having a single core. Alternatively, the processor system 106 includes a single processor having multiple cores and/or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes an image capture module 112. The image capture module 112 captures images digitally using any of a variety of different technologies, such as a charge-coupled device (CCD) sensor, a complementary metal-oxide-semiconductor (CMOS) sensor, combinations thereof, and so forth. The image capture module 112 can include a single sensor and lens, or alternatively multiple sensors and multiple lenses. For example, the image capture module 112 may have at least one lens and sensor positioned to capture images from the front of the computing device 102 (e.g., the same surface as the display is positioned on), and at least one additional lens and sensor positioned to capture images from the back of the computing device 102.

The image capture module 112 can capture still images as well as video. The media content discussed herein refers to one or both of still images and video. The captured images and/or video are stored in a storage device 114 as a media content collection 116. The storage device 114 can be implemented using any of a variety of storage technologies, such as magnetic disk, optical disc, Flash or other solid state memory, and so forth.

The computing device 102 also includes a biometric information detection system 120, a content access control system 122, and a notification system 124. Each of the biometric information detection system 120, the content access control system 122, and the notification system 124 can be implemented in a variety of different manners. For example, each of the systems 120, 122, and 124 can be implemented as multiple instructions stored on computer-readable storage media and that can be executed by the processor system 110. Additionally or alternatively, each of the systems 120, 122, and 124 can be implemented at least in part in hardware (e.g., as an application-specific integrated circuit (ASIC), a field-programmable gate array (FPGA), and so forth). One or more of the systems 120, 122, and 124 can be implemented in the same manner, or the systems 120, 122, and 124 can each be implemented in a different manner. Furthermore, although illustrated as separate from the operating system 108, one or more of the biometric information detection system 120, the content access control system 122, and the notification system 124 can be implemented at least in part as part of the operating system 108.

Generally, the biometric information detection system 120 detects various biometric information regarding the current user of the computing device 102 in order to assist the content access control system 122 in recognizing the current user of the computing device 102. Various different biometric information can be detected by the biometric information detection system 120, such as voice information, face information, fingerprint information, grip information, and so forth. The content access control system 122 determines whether the current user of the computing device 102 is an owner of the computing device 102 or a secondary user, and allows access to media content collection 116 in accordance with whether the current user is the owner or a secondary user of the computing device 102. The notification system 124 displays or otherwise presents notifications from the operating system 108 or an application 110, such as text message notifications, calendar reminders, incoming phone call notifications, and so forth. The notification system 124 disables presentation of notifications by the computing device 102 if the current user is a secondary user as discussed in more detail below.

The current user of the computing device 102 is also referred to as the current user that is in possession of the computing device 102 or the user that is currently in possession of the computing device 102. A user being in possession of the computing device 102 refers to a user that is physically in control of or currently accessing the computing device 102. For example, the user that is holding the computing device 102 (e.g., with his or her hand) is the current user that is in possession of the computing device 102.

The biometric information detection system 120 detects various biometric information regarding the current user of the computing device 102. This biometric information can be, for example, information describing the user's voice, facial features, fingerprint features, grip on the computing device 102, and so forth. Any of a variety of different public and/or proprietary techniques can be used to obtain the biometric information, and the particular techniques implemented by the biometric information detection system 120 can vary based on the particular biometric information that is obtained by the biometric information detection system 120.

For example, facial features can be obtained from a current image captured by the image capture module 112 and can include information regarding size and/or location of different aspects of a user's face, such as eyes, nose, mouth corners, ears, and so forth. By way of another example, fingerprint features can be obtained from a fingerprint sensor of the computing device 102 (e.g., a capacitive scanner, an optical scanner, an ultrasonic scanner, etc.) and can include information regarding the pattern of ridges or lines on one or more of the user's fingers. By way of another example, voice input can be captured by a microphone of the computing device 102 and can include information regarding different aspects of speech (e.g., phonemes) and the order and timing of the occurrence of those phonemes. By way of yet another example, touch features regarding how the user is touching or gripping the computing device 102 can be obtained from one or more touch sensors distributed around the computing device 102 (e.g., one or more pressure sensors, one or more capacitive sensors, one or more optical sensors, etc.) and can include information regarding the locations of the computing device 102 being touched by the user, an amount of force applied by the user in touching different locations of the computing device 102, and so forth.

The content access control system 122 includes a current user detection module 132 and an access control module 134. The current user detection module 132 uses the biometric information obtained by the biometric information detection system 120 to determine whether the owner of the computing device 102 or a secondary user of the computing device 102 is in possession of the computing device 102. The current user detection module 132 can make this determination in different manners based on the biometric information obtained by the biometric information detection system 120.

For example, the biometric information detected by the biometric information detection system 120 is compared to authentication information previously provided by the owner of the computing device 102 to determine whether the biometric information matches the authentication information. Whether the biometric information matches the authentication information can be determined in different manners, such as determining whether the biometric information is the same as the authentication information, determining whether there is at least a threshold probability (e.g., 90%) that the biometric information and the authentication information identify the same user, and so forth. If the biometric information matches the authentication information for the owner, then the current user detection module 132 determines that the owner is in possession of the phone. If the biometric information does not match the authentication information for the owner, then the current user detection module 132 determines that a secondary user is in possession of the phone. This authentication information can be provided to the computing device 102, for example, as part of a registration or login process. The authentication information is maintained by the computing device 102, such as in the storage device 114. By way of example, facial features or fingerprint features of the owner of the computing device 102 can be obtained and stored as part of a registration process for the owner of the computing device 102.

In one or more embodiments, the current user detection module 132 analyzes facial features detected by the biometric information detection system 120. The biometric information detection system 120 can identify a single face in a current captured image and determine facial features for that single face, or can identify multiple faces in the current captured image and determine facial features for each of those multiple faces. The current user detection module 132 compares the facial features to authentication information previously provided by the owner to determine whether the facial features in any of the faces detected by the biometric information detection system 120 match (e.g., are the same as, have at least threshold probability (e.g., 90%) of identifying the same user) the authentication information. If a match is found between a face in the current captured image and the authentication information, then the owner is deemed to be in possession of the computing device 102 (e.g., because the owner is within view of the camera/lens of the computing device 102). If a match is not found between a face in the current captured image and the authentication information, then a secondary user is deemed to be in possession of the computing device 102.

Additionally or alternatively, the current user detection module 132 analyzes other features detected by the biometric information detection system 120. Examples of these other features, as discussed above, include fingerprint features, aspects of voice captured by the computing device 102, touch features regarding how the user is touching or gripping the computing device 102, and so forth. The current user detection module 132 compares the detected features to authentication information previously provided by the owner to determine whether the detected features match the authentication information. For example, the current user detection module 132 compares the detected features (fingerprint features or aspects of voice captured by the computing device 102, or touch features regarding how the user is touching or gripping the computing device 102) to authentication information previously provided by the owner to determine whether the detected features match (e.g., are the same as, have at least threshold probability (e.g., 90%) of identifying the same user) the authentication information. If a match is found between the detected features and the authentication information, then the owner is deemed to be in possession of the computing device 102. If a match is not found between the detected features and the authentication information, then a secondary user is deemed to be in possession of the computing device 102.

The access control module 134 controls access to media content in the media content collection 116 as well as optionally additional content (e.g., notifications) that may be displayed or otherwise presented by the computing device 102. The access control module 134 can control access to content in a variety of different manners, such as sending communications (e.g., messages, events, or other indications) to other systems or applications (e.g., the operating system 108, the image capture module 112, the notification system 124) indicating what content can be displayed. These communications can indicate, for example, that all content can be displayed, that only content containing particular users can be displayed, and so forth. The access control module 134 can additionally or alternatively control access to content in different manners, such as receiving content from other systems or applications (e.g., the operating system 108, the image capture module 112, the notification system 124), determining whether the content is to be displayed or otherwise presented, and displaying (or otherwise presenting) or not displaying (or otherwise not presenting) the content based on the determination.

The access control module 134 obtains an indication from the current user detection module 132 whether a current user of the computing device 102 is the owner or a secondary user. This indication can take various forms, such as a passed parameter, a message or event, a register setting, and so forth. In response to the current user being detected as the owner of the computing device 102, the access control module 134 allows all content to be displayed or otherwise presented by the computing device 102, including all of the media content in the media content collection 116. It should be noted that additional restrictions may optionally be placed on the display or other presentation of content by other security applications or systems, but those are in addition to the control enforced by the access control module 134.

In response to the current user being detected as a secondary user of the computing device 102, the access control module 134 allows media content that is from the media content collection 116 and that includes both the owner and the secondary user to be displayed or otherwise presented by the computing device 102. The media content displayed can optionally include one or more other people. The access control module 134 prevents other media content from the media content collection 116 that does not include both the owner and the secondary user from being displayed or otherwise presented by the computing device 102.

Which media content from the media content collection 116 includes both the owner and the secondary user can be determined in different manners. The authentication information for the owner of the computing device 102 can be used by the content access control system 122 or other system or module of the computing device 102 to identify which media content in the media content collection 116 includes the owner of the computing device 102. For example, the access control module 134 can determine which media content includes the owner of the computing device 102 by comparing the facial features in any of the faces detected by the biometric information detection system 120 in the media content to the authentication information, and determine that a face is the face of the owner if the facial features of the face match (e.g., are the same as, have at least threshold probability (e.g., 90%) of identifying the same user) the authentication information. The media content can optionally be tagged with that information (e.g., in metadata of the content in the media content collection 116, in a table or database associated with the media content collection 116) to allow media content that includes the owner to be readily identified at later times.

In situations in which the current user detection module 132 detects that a secondary user is in possession of the computing device 102 based on detected facial features of a user in a current image captured by the image capture module 112, those facial features are used by the access control module 134 to identify any other media content in the media content collection 116 that includes a face that matches the detected facial features. That other media content that includes a face that matches the detected facial features is media content that includes the secondary user. Each media content (e.g., each image, each video) in the media content collection 116 can be checked to determine whether the media content includes the secondary user, or alternatively only a subset of the media content collection 116 can be checked (e.g., only that media content that includes the owner, only that media content that satisfies other criteria as discussed in more detail below (e.g., temporal or geographic proximity), and so forth).

In situations in which the current user detection module 132 detects that a secondary user is in possession of the computing device 102 based on biometric information other than detected facial features of a user in a current image captured by the image capture module 112, a record associating that biometric information to detected facial features of the user or particular media content that includes the user is accessed to identify any other media content in the media content collection 116 that includes a face that matches the detected facial features. For example, the content access control system 122 can maintain an association between fingerprint features and facial features, and in response to particular fingerprint features being used to determine that that a secondary user is in possession of the computing device 102, the facial features associated with those particular fingerprint features can be used by the access control module 134 to identify any other media content in the media content collection 116 that includes a face that matches the associated facial features. It should be noted that the content access control system 122 need not keep track of any other information regarding or identifying the secondary user, only that particular fingerprint features are associated with particular facial features.

Additionally or alternatively, in situations in which the current user detection module 132 detects that a secondary user is in possession of the computing device 102 based on biometric information other than detected facial features of a user in a current image captured by the image capture module 112, the images that include the secondary user can be identified in other manners. For example, in response to determining that a secondary user is in possession of the computing device 102, the access control module 134 can notify the image capture module 112 to capture a current image and the biometric information detection system 120 can detect the facial features of one or more faces in the current image. Any face in the current image that includes facial features that do not match the facial features of the owner of the computing device 102 is deemed by the content access control system 122 to be the face of a secondary user. The facial features of the faces of the secondary user(s) can then be used by the access control module 134 to identify any other images in the media content collection 116 that include a face that matches the detected facial features.

Figure 2:
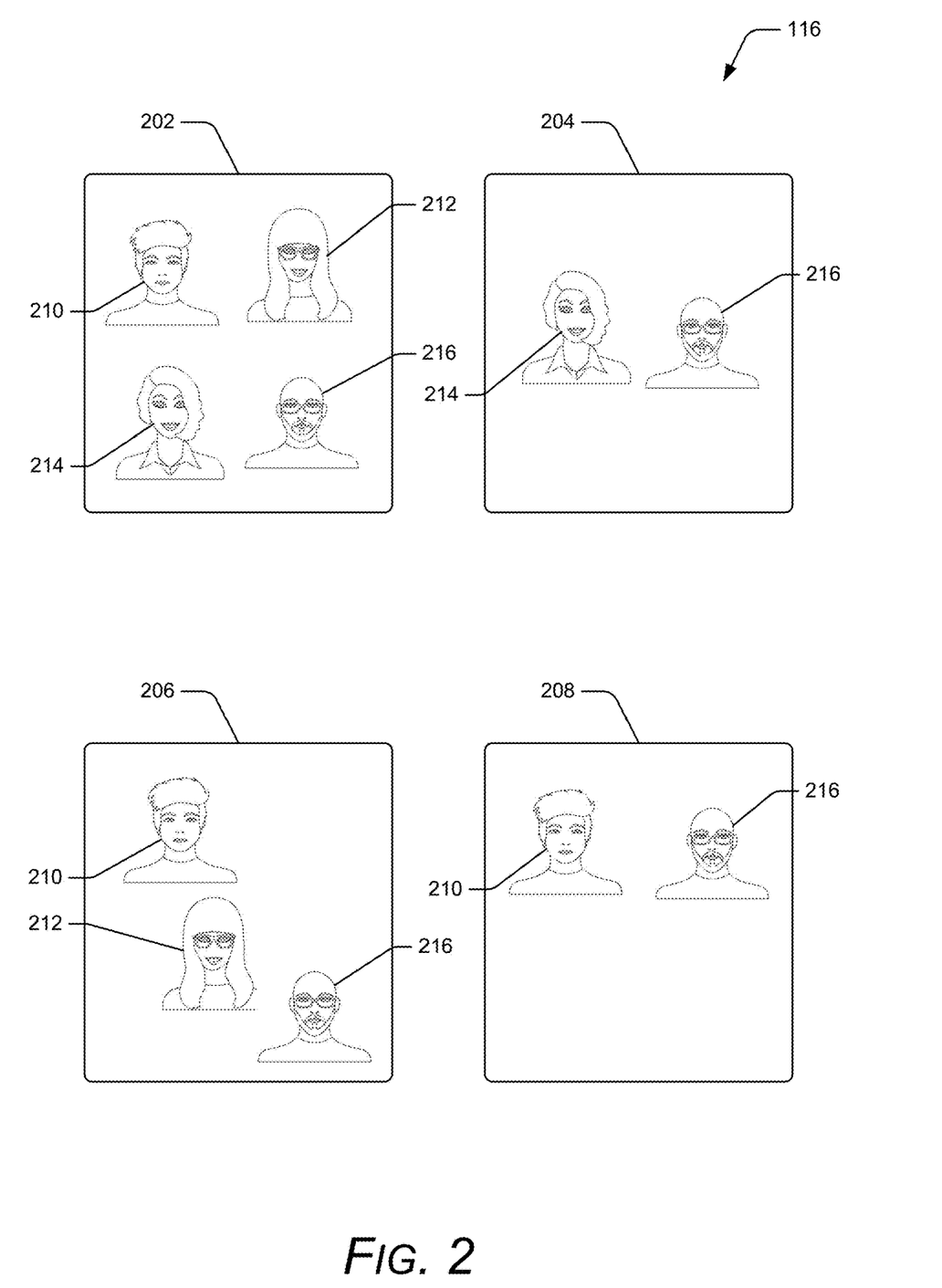
FIGS. 2, 3, 4, and 5 illustrate the displaying of different content for the owner and the secondary user in accordance with one or more embodiments.

FIGS. 2, 3, 4, and 5 illustrate the displaying of different content for the owner and the secondary user in accordance with one or more embodiments. In the illustrated example of FIGS. 2-5, media content collection 116 includes four images 202, 204, 206, and 208. Each of the images 202, 204, 206, and 208 includes faces of one or more of the users 210, 212, 214, and 216. User 210 is the owner of the computing device 102, and users 212, 214, and 216 can be secondary users of the computing device 102. In situations in which the owner is in possession of the computing device 102, all of the images in the media content collection 116 are allowed to be displayed. Thus, all four images 202, 204, 206, and 208 are displayed as illustrated in FIG. 2.

Figure 3:
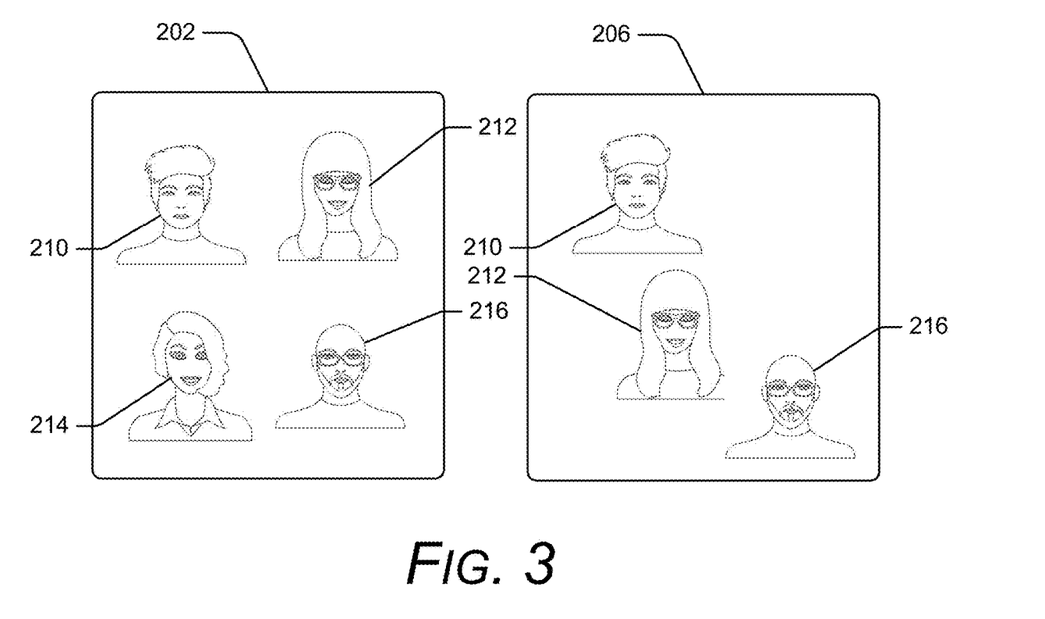
Figure 4:
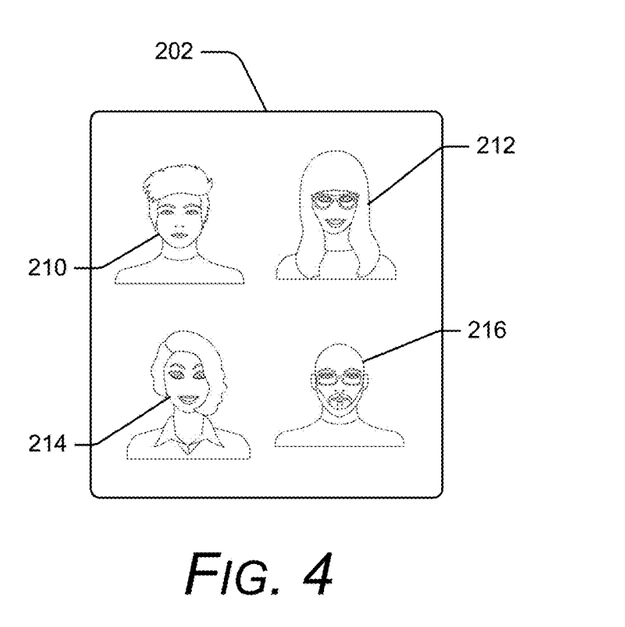
Figure 5:
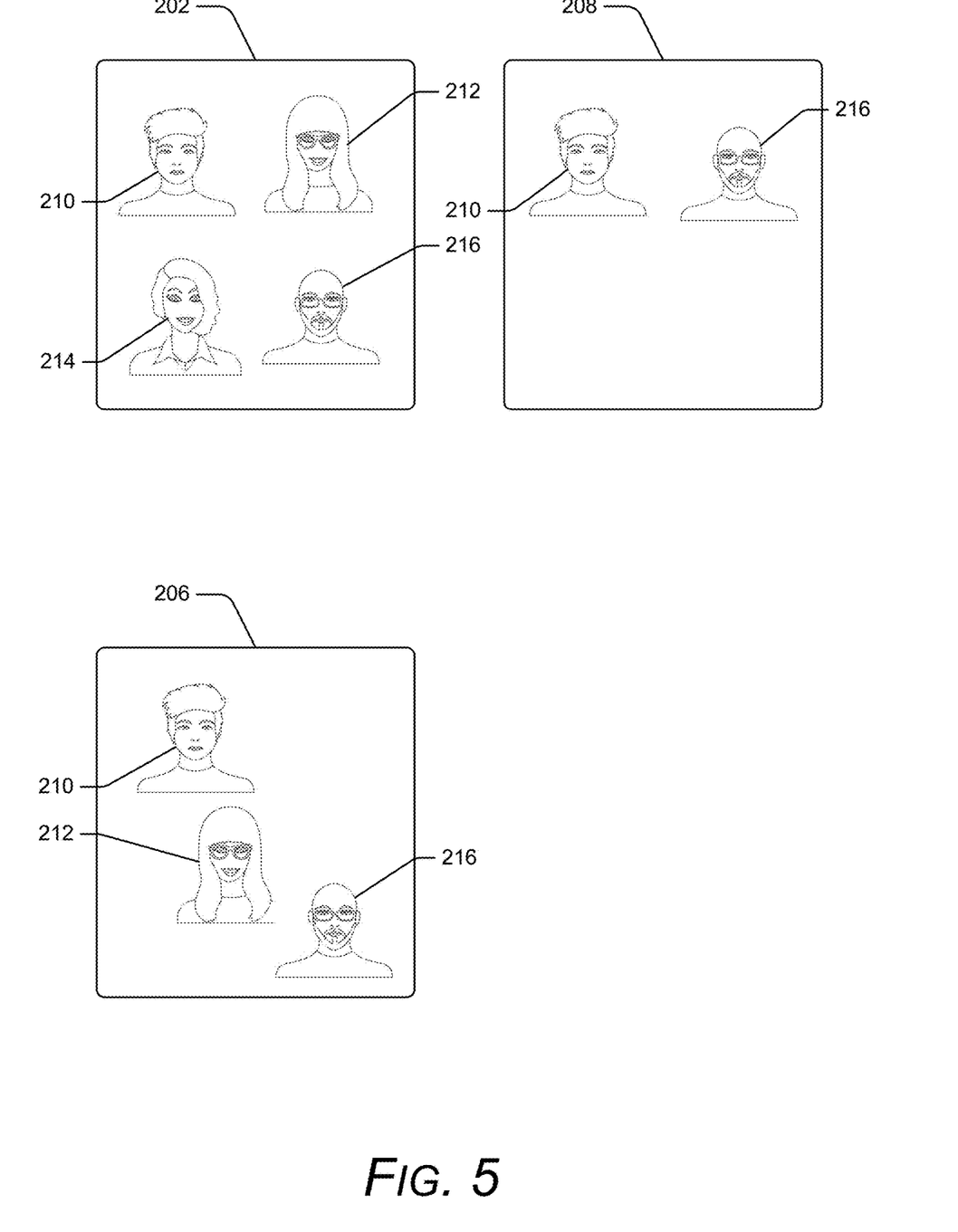

However, in situations in which a secondary user is in possession of the computing device 102, only those images in the media content collection 116 that include both the owner and the secondary user are displayed. Thus, in response to the user 212 being the secondary user in possession of the computing device 102, only images 202 and 206 are displayed as illustrated in FIG. 3. Similarly, in response to the user 214 being the secondary user in possession of the computing device 102, only image 202 is displayed as illustrated in FIG. 4. Similarly, in response to the user 216 being the secondary user in possession of the computing device 102, only images 202, 206, and 208 are displayed as illustrated in FIG. 5.

Returning to FIG. 1, it should be noted that which user is the secondary user can change over time, and that different secondary users have different features (e.g., different facial features, different fingerprint features, etc.). So, as the computing device 102 is passed around from person to person in a group, at any given time the secondary user that is in possession of the computing device 102 only sees that media content that includes both that secondary user and the owner. Which particular user is the secondary user can alter which media content the content access control system 122 displays (e.g., if the secondary user changes, which media content of the media content collection 116 includes both the owner and the secondary user can change). The determination of the secondary user can be made at different regular or irregular intervals, can be made in response to the occurrence of particular events, and so forth. For example, every threshold amount of time (e.g., ten seconds), the current user detection module 132 can determine the current user of the computing device 102. By way of another example, the current user detection module 132 can have current images captured at regular or irregular intervals (e.g., every five seconds) and identify faces in each newly captured current image to determine the current user of the computing device 102. By way of another example, in response to particular motion (e.g., movement of the computing device 102 by a threshold amount (such as two feet)) the current user detection module 132 can determine the current user of the computing device 102.

The access control module 134 is discussed above as displaying, in situations in which the computing device 102 is in possession of a secondary user, only media content from the media content collection 116 that includes both the secondary user and the owner. Additionally or alternatively, the access control module 134 can apply one or more additional criteria to determine which media content is displayed or otherwise presented. One such criteria is a time constraint. In situations in which the computing device 102 is in possession of a secondary user, the access control module 134 only displays or otherwise presents media content that has been captured within a threshold amount of time (e.g., ten minutes or one hour) of the current time. The media content in the media content collection 116 has associated capture data (e.g., metadata associated with each media content), such as a timestamp, that indicates when the media content was captured. The access control module 134 displays or otherwise presents the media content only if the timestamp indicates a capture time that is within the threshold amount of time of the current time. This results in only media content that has been captured recently being displayed to the secondary user.

Another such criteria that can be applied by the access control module 134 is a location constraint. In situations in which the computing device 102 is in possession of a secondary user, the access control module 134 only displays or otherwise presents media content that has been captured within a threshold distance (e.g., 50 yards or 1 mile) of the current geographical location of the computing device 102. The media content in the media content collection 116 has associated capture data (e.g., metadata associated with each media content), such as a geographic location, that indicates where the media content was captured (the geographic location of the computing device 102 at the time the media content was captured). The geographic location where the media content was captured can be obtained using any of a variety of public and/or proprietary location determination techniques, such as obtaining the location from a Global Positioning System (GPS) module of the computing device 102. The access control module 134 displays or otherwise presents the media content only if the captured geographic location is within the threshold distance of the current geographic location. This results in only media content that has been captured close to the current location of the computing device 102 being displayed to the secondary user.

Another such criteria that can be applied by the access control module 134 is a proximity constraint. In situations in which the computing device 102 is in possession of a secondary user, the access control module 134 only displays or otherwise presents media content that has been captured within close proximity to capturing of other media content that includes both the owner and the secondary user. This close proximity can be, for example, one or both of time-based and location based. For time-based close proximity, the media content in the media content collection 116 has associated capture data (e.g., metadata associated with each media content), such as a timestamp, that indicates when the media content was captured. The access control module 134 displays or otherwise presents the media content only if the timestamp indicates a capture time that is within a threshold amount of time (e.g., ten minutes or one hour) of the timestamp of other media content that includes both the owner and the secondary user. This criteria can further indicate that media content that includes both the owner and the secondary user is to be captured within a threshold amount of time (e.g., ten minutes or one hour) before the timestamp of other media content that includes both the owner and the secondary user and within the threshold amount of time (e.g., ten minutes or one hour) after the timestamp of other media content that includes both the owner and the secondary user. For example, if the owner A is at a particular location with secondary user B and takes first and second photos that include both owner A and secondary user B, then a third photo (within the threshold amount of time of taking the second photo) without secondary user B, then a fourth photo (within the threshold amount of time of taking the third photo) that includes both owner A and secondary user B, then the access control module 134 can display all four photos to the secondary user B even though the secondary user B is not in the third photo.

For location-based close proximity, the media content in the media content collection 116 has associated capture data (e.g., metadata associated with each media content), such as a geographic location, that indicates where the media content was captured. The access control module 134 displays or otherwise presents the media content only if the media content has been captured within a threshold distance (e.g., 50 yards or 1 mile) of the current geographical location of the computing device 102. This criteria can further indicate that media content that includes both the owner and the secondary user is to be captured at a geographic location within a threshold distance (e.g., 50 yards or 1 mile) of other media content that includes both the owner and the secondary user and that is captured before and after the media content. For example, if the owner A is at a particular location with secondary user B and takes first and second photos that include both owner A and secondary user B, then a third photo (within the threshold distance of the geographic location where the second photo was captured) without secondary user B, then a fourth photo (within the threshold distance of the geographic location where the third photo was captured) that includes both owner A and secondary user B, then the access control module 134 can display all four photos to the secondary user B even though the secondary user B is not in the third photo.

The access control module 134 controls access to media content in the media content collection 116 as discussed above. Furthermore, the access control module 134 also optionally controls access to other content that may be displayed or otherwise presented by the computing device 102. The access control module 134 can control access to various other types of contents, such as notifications from an application 110 or program of the operating system 108. A notification refers to a visual and/or audible alert of some event (e.g., receipt of a message at the computing device 102, reminder for a meeting or other calendar item, and so forth). These notifications can be, for example, identifiers of and optionally content of messages received from another device (e.g., via a Short Message Service (SMS) or Multimedia Messaging Service (MMS)), identifiers of and optionally content of messages from a calendar program or digital assistant, and so forth.

The access control module 134 can control access to notifications or other content in a variety of different manners as discussed above, such as sending communications (e.g., messages, events, or other indications) to other systems or applications (e.g., the operating system 108, an application 110, the notification system 124) indicating what content can be displayed, receiving content from other systems or applications (e.g., the operating system 108, an application 110, the notification system 124) and displaying or not displaying the content, and so forth.

In one or more embodiments, the computing device 102 includes a notification system 124 with a notification queue 136. In situations in which the owner is in possession of the computing device 102, the access control module 134 informs the notification system 124 that all notifications can be displayed or otherwise presented by the notification system 124. For example, when a new text message is received by the computing device 102 from another device, the notification system 124 can display on the display 104 a notification that the text message has been received. This notification can be an identifier of the text message, at least part of the content of the text message, an identifier of the sender of the text message, an audible alert played back through a speaker of the computing device 102, and so forth.

In situations in which a secondary user is in possession of the computing device 102, the access control module 134 informs the notification system 124 to disable the display or other presentation of notifications. Generally, disabling the display or other presentation of notifications refers to not displaying or otherwise presenting the notifications. This prevents notifications that may be of a private nature from being displayed by the computing device 102 while the computing device 102 is in the possession of a secondary user.

The notification system 124 can disable the display or other presentation of notifications in a variety of different manners. For example, the notification system 124 can place notifications in the notification queue 136. The notifications in the notification queue 136 are not immediately displayed or otherwise presented by the notification system 124, but can be later displayed or otherwise presented in response to occurrence of an event, such as the content access control system 122 detecting that the owner of the computing device 102 is in possession of the computing device 102, a request from the owner of the computing device 102 to display or otherwise present the notifications in the notification queue 136, and so forth.

Additionally or alternatively, the notification system 124 can disable the display or other presentation of notifications in other manners. For example, the notification system 124 can simply ignore or delete the notifications (in which case the notifications need not be placed in the notification queue 136). By way of another example, the notification system 124 can inform the source of the notification (e.g., operating system 108 or application 110) that the notification will not be displayed or otherwise presented by the computing device 102. This allows the source of the notification to take an appropriate responsive action if desired (e.g., re-send the notification to the notification system 124 at a later time).

Figure 6:
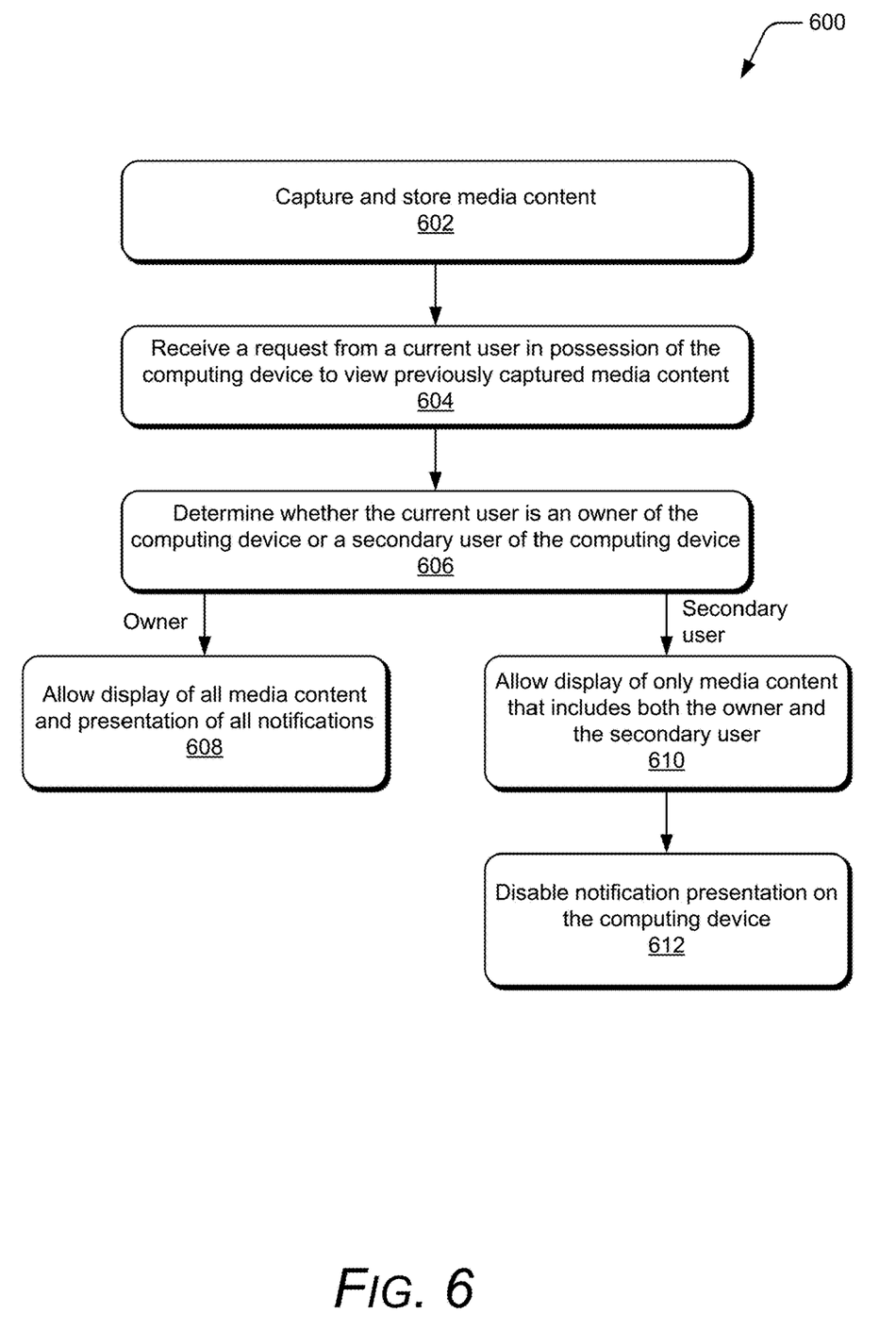
FIG. 6 illustrates an example process for implementing the techniques discussed herein in accordance with one or more embodiments.

FIG. 6 illustrates an example process 600 for implementing the techniques discussed herein in accordance with one or more embodiments. Process 600 is carried out by a content access control system, such as the content access control system 122 of FIG. 1, and can be implemented in software, firmware, hardware, or combinations thereof. Process 600 is shown as a set of acts and is not limited to the order shown for performing the operations of the various acts.

In process 600, media content is captured and stored (act 602). The media content is stored in, for example, the media content collection 116 of FIG. 1. The media content can include still images, video, and so forth.

A request is received from a current user in possession of the computing device to view previously captured media content (act 604). The request can be received in a variety of different manners, such as a voice input, selection of an item (e.g., an icon or button) displayed on a touchscreen display, selection of a physical button, input of a gesture on a touchscreen, and so forth.

In response to the request, a determination is made as to whether the current user is an owner of the computing device or a secondary user of the computing device (act 606). This determination can be made based on a variety of different biometric information regarding the current user of the computing device as discussed above, such as information describing the user's voice, information describing the user's facial features, information describing the user's fingerprint features, information describing the user's grip on the computing device 102, and so forth.

In response to a determination that the current user is the owner of the computing device, all media content is allowed to be displayed or otherwise presented and all other content (e.g., notifications) are allowed to be displayed or otherwise presented (act 608). Generally, if the owner of the computing device is in possession of the computing device, the content access control system places no restrictions to access to content on the computing device.

In response to a determination that the current user is a secondary user of the computing device, only media content that includes both the secondary user (the current user) and the owner is allowed to be displayed or otherwise presented (act 610). Various additional criteria can be used to determine which media content is displayed or otherwise presented as discussed above, such as a time constraint or a location constraint.

Additionally, in response to a determination that the current user is a secondary user of the computing device, notification presentation on the computing device is disabled (act 612). These notifications can be, for example, identifiers of and optionally content of messages text messages, identifiers of and optionally content of messages from a calendar program or digital assistant, and so forth as discussed above.

Returning to FIG. 1, it should be noted that the techniques discussed herein can be used regardless of whether the owner of the computing device 102 is logged into the computing device 102. Thus, even if the computing device 102 is in a locked state (e.g., waiting for the owner of the computing device 102 to enter the appropriate credentials to log into the computing device 102), a secondary user can pick up the computing device 102 and have media content from the media content collection 116 displayed (subject to the content access control system 122).

Furthermore, in some situations the computing device 102 allows for multi-user login, which refers to different users having different credentials and/or accounts allowing them to login to the computing device 102. The secondary user discussed herein is different from a user in a multi-user login situation. The secondary user discussed herein need not login to the computing device 102, and typically does not have an account on the computing device 102 to login to (the computing device 102 does not maintain login credentials for the secondary user). Nonetheless, the secondary user is still able to view media content that includes the secondary user and the owner of the computing device 102 as discussed herein.

It should also be noted that one or more of the various components, modules, systems, and so forth illustrated as being part of the computing device 102 can be implemented at least in part on a remote device, such as a server. The remote device can be accessed via any of a variety of wired and/or wireless connections. The remote device can further be accessed via any of a variety of different data networks, such as the Internet, a local area network (LAN), a phone network, and so forth. For example, various functionality performed by one or more of the various components, modules, systems, and so forth illustrated as being part of the computing device 102 can be offloaded onto a remote device (e.g., for performance of the functionality "in the cloud").

The techniques discussed herein support various different usage scenarios. For example, if the owner is in possession of the computing device 102, then the content access control system 122 allows all media content in the media content collection 116, as well as other content (e.g., notifications), to be displayed or otherwise presented. The content access control system 122 assumes that because the owner is in possession of the computing device 102, it is acceptable to the owner to allow any content to be displayed or otherwise presented by the computing device 102 regardless of who else is able to view the content at the time. However, if the secondary user is in possession of the computing device 102, then the content access control system 122 restricts access to media content and notifications. The content access control system 122 assumes that because the secondary user is in possession of the computing device 102, the owner is not in possession of the computing device 102 and thus it is not acceptable so the owner to allow all content to be displayed or otherwise presented by the computing device 102.

By way of another example, assume that the owner of the computing device 102 is planning a surprise birthday party for his wife. The owner's wife is a secondary user, so if she picks up his phone she's able to look at photos that include both the owner and his wife. However, other photos of the owner shopping alone for his wife's birthday present would not be displayed by the computing device 102 while the computing device 102 in the possession of his wife. Furthermore, text messages from other friends about the surprise party will not be displayed by the computing device 102 while the computing device 102 is in the possession of his wife.

Figure 7:
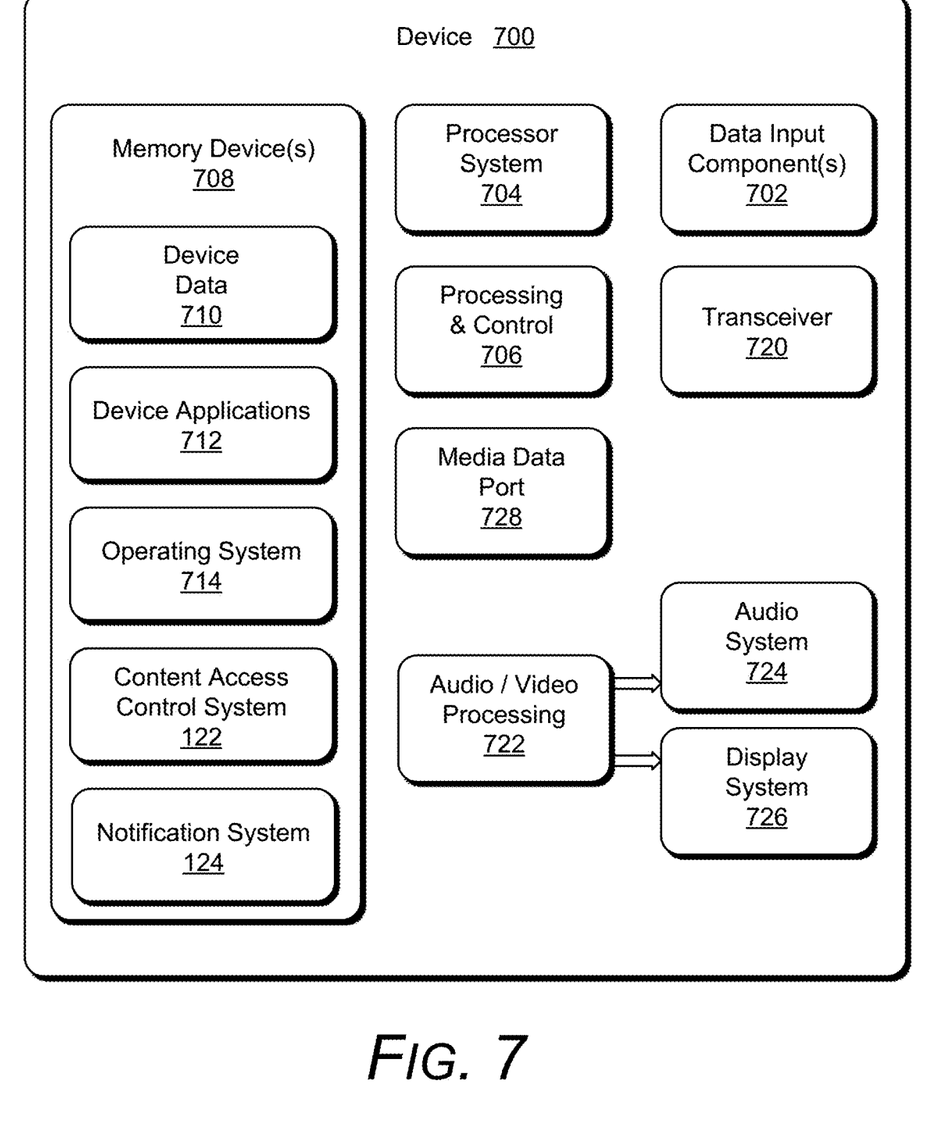
FIG. 7 illustrates various components of an example electronic device that can implement embodiments of the techniques discussed herein.

FIG. 7 illustrates various components of an example electronic device 700 that can be implemented as a computing device as described with reference to any of the previous FIGS. 1-6. The device 700 may be implemented as any one or combination of a fixed or mobile device in any form of a consumer, computer, portable, user, communication, phone, navigation, gaming, messaging, Web browsing, paging, media playback, or other type of electronic device.

The electronic device 700 can include one or more data input components 702 via which any type of data, media content, or inputs can be received such as user-selectable inputs, messages, music, television content, recorded video content, and any other type of audio, video, or image data received from any content or data source. The data input components 702 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 702 may also include various other input components such as microphones, touch sensors, keyboards, cameras or other image capture components, and so forth.

The electronic device 700 of this example includes a processor system 704 (e.g., any of microprocessors, controllers, and the like) or a processor and memory system (e.g., implemented in a system on a chip), which processes computer executable instructions to control operation of the device 700. A processor system 704 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 700 can be implemented with any one or combination of software, hardware, firmware, or fixed logic circuitry implemented in connection with processing and control circuits that are generally identified at 706. Although not shown, the electronic device 700 can include a system bus or data transfer system that couples the various components within the device 700. A system bus can include any one or combination of different bus structures such as a memory bus or memory controller, a peripheral bus, a universal serial bus, or a processor or local bus that utilizes any of a variety of bus architectures.

The electronic device 700 also includes one or more memory devices 708 that enable data storage such as random access memory, nonvolatile memory (e.g., read only memory, flash memory, erasable programmable read only memory, electrically erasable programmable read only memory, etc.), and a disk storage device. A memory device 708 provides data storage mechanisms to store the device data 710, other types of information or data (e.g., data backed up from other devices), and various device applications 712 (e.g., software applications). For example, an operating system 714 can be maintained as software instructions with a memory device and executed by the processor system 704.

In one or more embodiments the electronic device 700 includes a content access control system 122 and a notification system 124, described above. Although represented as a software implementation, one or both of the content access control system 122 and the notification system 124 may be implemented as any form of a control application, software application, signal processing and control module, firmware that is installed on the device 700, a hardware implementation of the modules, and so on.

Moreover, in one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 708.

The electronic device 700 also includes a transceiver 720 that supports wireless and/or wired communication with other devices or services allowing data and control information to be sent as well as received by the device 700. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, and so forth.

The electronic device 700 can also include an audio or video processing system 722 that processes audio data or passes through the audio and video data to an audio system 724 or to a display system 726. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 728. In implementations the audio system or the display system are external components to the electronic device. Alternatively or in addition, the display system can be an integrated component of the example electronic device, such as part of an integrated touch interface.

Although embodiments of techniques for implementing controlling non-owner access to media content on a computing device have been described in language specific to features or methods, the subject of the appended claims is not necessarily limited to the specific features or methods described. Rather, the specific features and methods are disclosed as example implementations of techniques for implementing controlling non-owner access to media content on a computing device.

What is claimed is:

1. A method implemented in a computing device, the method comprising:
   receiving, from a current user that is in possession of the computing device, a request to view media content previously captured by the computing device;
   determining, by the computing device, whether the current user is an owner of the computing device or a secondary user of the computing device;
   automatically analyzing, by the computing device, the media content to identify a subset of the media content that includes both the secondary user and the owner without requiring the owner to manually select the subset of the media content;
   displaying, by the computing device in response to determining that the current user is the secondary user of the computing device, the subset of the media content that includes both the secondary user and the owner but not displaying media content that does not include both the secondary user and the owner; and
   allowing, by the computing device in response to determining that the current user is the owner of the device, display of all of the media content.

2. The method as recited in claim 1, the automatically analyzing including automatically analyzing the media content to identify, as the subset of the media content, content that has been captured within a threshold amount of time of a current time, and the displaying including displaying, in response to detecting that the current user is the secondary user of the computing device, the subset of the media content that includes both the secondary user and the owner and that has been captured within the threshold amount of time of a current time.

3. The method as recited in claim 1, the automatically analyzing including automatically analyzing the media content to identify, as the subset of the media content, content that has been captured within a threshold distance of a current geographic location of the computing device, and the displaying including displaying, in response to detecting that the current user is the secondary user of the computing device, the subset of the media content that includes both the secondary user and the owner and that has been captured within the threshold distance of a current geographic location of the computing device.

4. The method as recited in claim 1, the automatically analyzing including automatically analyzing the media content to identify, as the subset of the media content, content that has been captured within close proximity to capturing of other media content that includes both the owner and the secondary user, and the displaying including displaying, in response to detecting that the current user is the secondary user of the computing device, the subset of the media content that includes both the secondary user and the owner as well as media content that does not include both the secondary user and the owner but has been captured within close proximity to capturing of other media content that includes both the owner and the secondary user.

5. The method as recited in claim 1, further comprising disabling, in response to detecting that the current user is the secondary user of the computing device, presentation of notifications on the computing device.

6. The method as recited in claim 5, the notifications comprising a notification of a received text message.

7. The method as recited in claim 1, the determining comprising determining that the current user is the owner in response to a current image captured by the computing device including a face of the owner, and determining that the current user is the secondary user in response to the current image captured by the computing device not including the face of the owner.

8. The method as recited in claim 1, the determining comprising using touch features regarding how the current user is touching or gripping the computing device to determine whether the current user is the owner or a secondary user of the computing device.

9. The method as recited in claim 1, the determining comprising using fingerprint features of the current user to determine whether the current user is the owner or a secondary user of the computing device.

10. The method as recited in claim 1, the determining comprising using a voice of the current user to determine whether the current user is the owner or a secondary user of the computing device.

11. The method as recited in claim 1, further comprising performing the receiving, determining, and displaying while the computing device is in a locked state.

12. The method as recited in claim 1, further comprising maintaining no credentials for the secondary user to login to the computing device.

13. The method as recited in claim 1, further comprising:
determining whether the current user is an additional secondary user of the computing device; and
displaying, in response to determining that the current user is the additional secondary user of the computing device, only media content that includes both the additionally secondary user and the owner.

14. A computing device comprising:
a processor implemented at least in part in hardware; and
a computer-readable storage medium having stored thereon multiple instructions that, responsive to execution by the processor, cause the processor to perform acts including:
capturing an image;
receiving, from a current user that is in possession of the computing device, a request to view the captured image;
determining whether the current user is an owner of the computing device or a secondary user of the computing device;
automatically analyzing, by the computing device, the captured image to determine whether the current user is the secondary user of the computing device without requiring the owner to manually select the captured image;
displaying, in response to determining that the current user is the secondary user of the computing device, the captured image only if the captured image includes both the secondary user and the owner; and
allowing, in response to determining that the current user is the owner of the device, display of all of the media content.

15. The computing device as recited in claim 14, the automatically analyzing including automatically analyzing the captured image to determine whether the captured image was captured within a threshold amount of time of a current time, and the displaying including displaying, in response to detecting that the current user is the secondary user of the computing device, the captured image only in response to the captured image including both the secondary user and the owner and the captured image having been captured within a threshold amount of time of a current time.

16. The computing device as recited in claim 14, the determining comprising determining that the current user is the owner in response to a current image captured by the computing device including a face of the owner, and determining that the current user is the secondary user in response to the current image captured by the computing device not including the face of the owner.

17. A computing device comprising:
an image capture module;
a storage device; and
a content access control system, implemented at least in part in hardware, the content access control system including:
a current user detection module configured to determine whether a current user that is in possession of the computing device is an owner of the computing device or a secondary user of the computing device; and
an access control module configured to automatically analyze media content stored in the storage device to identify a subset of the media content that includes both the secondary user and the owner without requiring the owner to manually select the subset of the media content, and to allow, in response to determining that the current user is the secondary user of the computing device, display of the subset of the media content but not media content that does not include both the secondary user and the owner, and to allow, in response to determining that the current user is the owner of the device, display of all of the media content stored in the storage device.

18. The computing device as recited in claim 17, wherein to automatically analyze the media content is to automatically analyze the media content to identify, as the subset of the media content, content that has been captured within a threshold amount of time of a current time, and the access control module being further configured to allow, in response to detecting that the current user is the secondary user of the computing device, display of the subset of the media content stored in the storage device that includes both the secondary user and the owner and that has been captured within the threshold amount of time of a current time.

19. The computing device as recited in claim 17, the access control module being further configured to disable, in response to detecting that the current user is the secondary user of the computing device, display of text message notifications on the computing device.

20. The computing device as recited in claim 17, the current user detection module being further configured to determine that the current user is the owner in response to a current image captured by the image capture module including a face of the owner, and to determine that the current user is the secondary user in response to the current image captured by the image capture module not including the face of the owner.

* * * * *